United States Patent Office 2,854,426
Patented Sept. 30, 1958

2,854,426

PROCESS OF MILLING SYNTHETIC RUBBER LATEX COAGULUM CONTAINING WATER

Paul J. Dasher, Willoughby, Ohio, assignor to Dasher Rubber & Chemical Company, Fairport Harbor, Ohio, a corporation of Ohio No Drawing. Application August 11, 1954
Serial No. 449,278

11 Claims. (Cl. 260—41.5)

This invention relates to the treatment of residuums composed of partially or wholly coagulated rubber latices.

More particularly, it is concerned with a method for the conversion of such residuums into useful products.

In the commercial production of synthetic rubber latices, there constantly occurs an accumulation of so-called residuum of various types for which there has not heretofore been available any economical method of recovery.

Thus, for example, in the commercial production of synthetic latex by the emulsion polymerization of butadiene and styrene, as well as the production of synthetic rubber by the emulsion polymerization of butadiene and acrylonitrile, the tanks in which the polymerization is carried on, as well as the storage tanks and other equipment, unavoidably become lined with a film or films of the latex in partially or wholly coagulated form. It becomes necessary, therefore, in such cases, from time to time to strip the deposit of the coagulum from the surface of the tanks or other equipment. At present, there is available no satisfactory means for converting the stripped material to useful form, or for otherwise making any economic recovery thereof, and it is accordingly discarded and accumulates in relatively large quantities.

The same is true in the case of the production of other synthetic latices of rubbery material, in addition to the types above mentioned.

Aside from the residuums thus accumulating in the plants where such synthetic latices are produced, similar accumulations thereof occur in industrial operations utilizing such synthetic latices. Thus, for example, in the creaming and other methods for concentrating synthetic rubber latices, the destablizing agents normally incorporated with the latex frequently cause partial coagulation of the latex, in amounts which though relatively small in relation to the total amount of latex treated in this way, nevertheless represent considerable losses. Further, in the commercial production of various finished products from synthetic rubber latex in which the latex is held for varying periods of time in storage tanks or in necessary treating equipment, there frequently occurs from those and other causes, undesired partial coagulation of the latex, necessitating its removal and discard as waste.

The principal object of the invention is to provide a suitable and economical method for the treatment of such coagula or residuums, whereby to convert the same into useful material.

By the term "synthetic rubber latex" or terms of like import herein, it is intended to include not only the butadiene-styrene copolymers and butadiene-acrylonitrile copolymers above mentioned, but also other known aqueous emulsion polymerizates, including isoprene polymers and copolymers, polybutadiene, copolymers of butadiene and isobutylene, polymers and copolymers of vinyl chloride, and the like.

As is known to those skilled in the art, the residuums referred to above are composed of macroscopic flocs and necessarily contain relatively high but variable amounts of water. While they contain no curing agents, they may or may not contain, in addition to the polymer or copolymer solids, other substances, such as anti-oxidants, soaps or other emulsion stabilizer agents, etc., incorporated before or during the emulsion polymerization process, or during the treatment of the latex. The presence or absence of such other substances in the residuum is dependent upon the particular part of the plant from which the residuum is derived or separated.

Another object of the invention is to provide for the useful recovery of such waste residuums or coagula which will be applicable whether or not the waste contains any such other added substances.

I have found that notwithstanding the relatively high and variable water content of residuums of the types herein referred to, they may readily be transformed by my invention in an economical manner into the form of a sheetable mass of the synthetic rubber.

Briefly, according to the invention, this result may be achieved by treating the residuums under certain conditions, as hereinafter fully set forth, by mechanical action, preferably in a Banbury machine.

The Banbury machine has long been known and used in the rubber industry for masticating raw or unvulcanized rubber, as well as for mixing and compounding the same with fillers, vulcanization accelerators and other compounding agents. As is well known, the Banbury machine comprises essentially a pair of bladed rotors mounted for rotation in opposite directions, adjacent one another in a working chamber comprising a pair of semi-cylindrical troughs, the rotors being shaped so as to smear the material in the trough against the walls thereof, forcing it upwardly and kneading it as it moves toward the longitudinal center of the machine from one trough to the other, the material being held within the sphere of action of the bladed rotors by a pneumatically-operated ram. The general construction of the Banbury machine in the form in which it has been extensively employed in the rubber industry for breaking down or masticating rubber and for compounding the same with fillers, etc., is shown, for example, in the Banbury Patent No. 1,881,994.

In accordance with my invention, the waste residuums or coagula of synthetic rubber latices may be recovered by subjecting the same to treatment in the Banbury machine, suitably modified in its construction and operation, as hereinafter more fully stated.

More specifically, a bath of predetermined weight of the residuum, containing, as above indicated, relatively high amounts of water, which may be in the range of from approximately 10% to approximately 50%, is loaded into the working chamber of the Banbury machine in any convenient fashion and is there subjected to the intense shearing action of the bladed rotors, mechanical pressure being exerted on the batch by the pneumatically-operated ram. Upon lowering of the ram, a substantial portion of the water will be mechanically expressed from the batch and will find its escape from the chamber through the discharge door at the bottom of the machine. Removal of the water rising above the ram may be facilitated by connecting suitable aspirating mechanism at that location, thereby avoiding formation of a water seal which would retard escape of steam evolving as a result of the heat attained by the batch in the working chamber.

The mechanical pressure is sufficient to compact and densify the batch to such an extent that the shearing action will rapidly bring about a high input of mechanical energy.

This high input of mechanical energy, resulting in a rapid heating of the batch, will convert the water contained therein into steam. To facilitate a more rapid rise in the temperature of the batch, steam may desirably be fed through the interior of the rotors. This expedient is more especially desirable when there are present any hard lumps of material in the batch undergoing treatment.

So long as a significant amount of water remains in the batch, its temperature will be largely dependent upon the steam pressure that has been developed. The steam, however, is allowed to escape from the working chamber, in order to prevent the pressure thereof from rising to the point where it may exceed the mechanical pressure which is being exerted upon the batch by the action of the ram. The machine may, if desired, be provided with suitable auxiliary means to facilitate the escape of the steam generated from the water contained in the batch undergoing the treatment. However, escape of steam will normaly take place at least to some extent through the clearances between the sides of the ram and the walls of the throat or neck of the machine in which the ram operates. More rapid escape of steam may be facilitated by momentary lifting of the ram from time to time, without providing on the machine special auxiliary means for that purpose.

The temperature which the batch may attain when thus subjected to the above-described action of the bladed rotors after substantially all of its original water content has been eliminated may vary from 250° to 300° F. or even higher. The temperature, however, should be held below those which might tend to cause resinification or decomposition of the material of the batch. In most instances it will be preferable to conduct the operation so that the temperature attained by the batch will be from 250° to 300° F. In this connection, it is pointed out that the temperature figures here stated are based upon measurements with electronic recorders. These are believed to give more accurate readings than those indicated by the usual Wheatstone bridge recorders. Accordingly, the figures herein given may be somewhat different than when the temperatures are taken by such usual methods, and may vary therefrom somewhat, according to the size and functioning of the particular Banbury machine employed.

In subjecting the residuums to treatment as above set forth, entailing a rise in the temperature of the batch to within the range indicated, I find it desirable in most instances to incorporate in the batch, either before or during its subjection to the mechanical action, a suitable so-called "short-stop," in order to prevent the relatively high temperature from inducing undesirable resumption or prolongation of polymerization or copolymerization of the monomers which are present. It is known in the art of synthetic rubber production that when the polymerization is permitted to go to completion, the resulting synthetic rubber suffers a loss in certain desirable physical properties. As also known in that art, the polymerization or copolymerization may be retarded or controllably terminated by use of various substances known as "short-stops." Among the substances known to function in that capacity are hydroquinone, benzo-quinone, phenanthroquinone, sodium sulphide, furfural, hydroxylamine, hydroxylamine hydrochloride, phenyl ethanol amine, beta naphthyl diethanol amine, mesitol, ditertiary butyl cresol and the like.

For the purposes of my invention, the "short-stops" employed may be such as the commercialy available product designated "Age Rite White" sold by R. T. Vanderbilt Company, and which is understood to be di-beta-naphthyl-p-phenylene diamine, manufacture by Goodrich Rubber Company, or the product designated "Wing Stay S," made by Goodyear and understood to be a mixture of alkylated phenols.

In the case, for example, of residuum of GRS latex, the aforementioned "Wing Stay S" is preferably employed as the short-stop.

The short-stop material may be added to the batch before or after the latter is charged into the working chamber of the Banbury machine, in an amount of from 0.1% to 2% by weight of the batch.

For best results, there is preferably also incorporated with the batch at this stage, suitable finely-divided solid material, such as carbon black. The amount of such finely-divided solid employed may vary from about 5% to about 35% by weight of the batch. This finely-divided solid is rapidly and homogeneously distributed throughout the batch as it undergoes its treatment during the ensuing stage of the cycle of operation for subjecting the batch to the mechanical action of the bladed rotors of the machine.

During this stage of the treatment, the accompanying rise in the temperature of the batch is controlled so that it does not exceed the upper limits above stated.

In treating coagula in which there may be present any substantial amount of polymer or copolymer in the form of relatively hard lumps, I find that these may more readily be caused to go into solution in the mass in the working chamber by incorporating in the mass, say, five to ten percent of the same or similar polymerizate in normal state as soon as the batch has attained a temperature of approximately 220° F.

I have found that by operating in this manner, waste residuums of rubber latices may be converted into a unitary, coherent, plastic mass within a treating cycle of from about 2 to 10 minutes in the Banbury machine. The plasticity of the mass is such that when the batch is dumped or otherwise discharged from the machine it may readily be transformed by the usual rubber sheeting rolls into homogeneous sheets of uniform thickness, depending upon the setting of the rolls.

In this form, the resultant product may be utilized in much the same manner as is customarily the practice with synthetic rubber of the same polymer constitution. Thus, it may readily be compounded with suitable fillers, vulcanizers, accelerators and other necessary or desirable additives.

In order to prevent the excessive rise in temperature of the batch as above mentioned, any suitable cooling fluid, desirably water at a temperature of, say, 45–55° F., may be pumped at required velocity through the jacketed walls of the working chamber, as well as through the interior of the rotors of the machine. The velocity of the cooling water will depend chiefly upon the rate at which the temperature of the batch rises under the influence of the input of mechanical energy by the action of the rotors thereon, and upon the rate of heat transfer between the batch undergoing treatment and the walls of the chamber and rotors on the one hand, and between the walls and the water in the jacket and rotors on the other hand.

The necessity for utilizing means to abstract heat, or the rate of its abstraction, from the batch during the working thereof, will depend in the main upon the physical characteristics of the material undergoing treatment. Thus, when the material is one exhibiting a relatively high Mooney plasticity value, or when substances such as carbon black are utilized as above set forth to assist in the operation, the heat build-up under the mechanical action of the rotors may be too rapid; or this may result from other causes unavoidably present during the operation. Under such conditions it is more especially desirable that means such as aforesaid be utilized to abstract, or facilitate abstraction of, heat from the batch while being subjected to the mechanical action described.

In actual operation, the rotors of the machine are preferably driven at a speed of 50–100 R. P. M., while subjecting the batch in the working chamber to mechanical compression by the ram. This mechanical compression is preferably of the order of 150–200 pounds per square inch. In general, the conditions of operation will be such that the energy input will average in the range of from 1.5 to 6, or even more, horsepower per pound of material being treated, and preferably not less than 3.0 horsepower per pound thereof, taking into account the relatively low power input during the first portion of the operating cycle when it may be necessary from time to time to lift the ram momentarily in order to allow rapid escape of steam from the working chamber as above explained.

In the case, for example, of the commercial size Banbury machine known as the 3A, which is normally provided with a ram having a working surface whose area is 252 square inches, the pneumatic cylinder for operating the ram is preferably made to have an inside diameter of 16 inches or more. Thus the cross-sectional area of the cylinder will be at least 201 square inches. By utilizing hydraulic pressure of, say, 200 pounds per square inch in a cylinder of approximately 200 square inches area in cross-section, a ram having a working surface of approximately 250 square inches may be caused to exert mechanical pressure of the order of approximately 160 pounds per square inch upon the batch in the working chamber of the machine. It will be apparent, of course, that by increasing the air-pressure in the cylinder, or by enlarging its cross-sectional dimension, or by a combination of these two expedients, even higher mechanical pressures may be exerted upon the batch while subjecting it to the action of the bladed rotors of the machine.

The size of the batch is also a factor in contributing to the results obtained in the practice of the invention.

In determining the optimum size of the starting batch of residuum to be subjected to the above-described treatment in a given size of Banbury machine, there should be taken into account the reduction in its volume by reason of the elimination of its original water content, and also the increase in its volume by the volume of finely-divided solid material, if any, which is utilized in the treatment. If, taking these two factors into account, less than the optimum quantity of residuum is used in initially starting the treatment, the air pressure in the pneumatic cylinder may lower the ram to the point where it engages the limit stops in the neck or throat of the machine, with the result that the ram will not be exerting its full effect in causing the material in the working chamber to be under adequate pressure while being subjected to the shearing action of the bladed rotors. On the other hand, if more than the optimum quantity of the residuum is initially loaded into the machine, portions thereof may be trapped within, or may otherwise be caused to extend up into, the neck or throat of the machine during the operating cycle so as not fully to receive the effect of the shearing action. Accordingly, the optimum size of the starting batch is such as to avoid the occurrence of either of these undesirable conditions.

In determining the optimum size of the starting batch, due consideration should also manifestly be given to the specific gravity of the particular residuum to be treated.

In general, it may be stated that with a size 3A Banbury, whose rotors are operated by a 600 horsepower motor, at a rotor speed of 50 R. P. M., the starting batch will amount to from 165 to 185 pounds when the coagulum contains water in an amount of the order of 35% by weight.

Herebelow are given more in detail several illustrative examples of the practice of the invention. It will be understood, of course, that these are given only for the purpose of illustrating the invention and are not intended to be restrictive of its scope.

*Example I*

In this example, there was utilized, as the starting material, a partially coagulated GRS latex residuum in the form of wet, irregular chunks, and containing approximately 60% polymer solids, this being material presently being considered as waste at the plant where it is produced, and discarded as such.

Approximately 170 pounds of this residuum, were charged into a 3A Banbury machine constructed and operated as above set forth, utilizing an air pressure of 200 pounds per square inch for operating the ram. A substantial portion of the water content of the residuum was expressed therefrom promptly after the ram was forced into contact with the batch, and found its exit through or around the hinged discharge door at the bottom of the machine. Other portions of the original water content reached up into the neck of the machine and were removed by aspirating the same. With steam at 100 pounds per square inch pressure in the interior of the rotors, the temperature of the mass increased rapidly under the intense mechanical action exerted by the rotors. Steam evolving from water contained in the batch escaped readily through the clearance space between the sides of the ram and the interior walls of the neck.

In a series of several hundred batches of the above-mentioned GRS residuum treated in this manner, the time cycle of treatment averaged approximately eight minutes, with none exceeding approximately ten minutes. The temperature of the batches reached the order of 255° F., quickly after substantially all the water had been eliminated from the batches, although in a few instances, the temperature rose to as high as approximately 280° F. This, however, was the exception rather than the rule, when relatively cold water was pumped at adequate velocity through the jackets of the working chamber. The power input in this series of runs averaged approximately 3.5 horsepower per pound of dry weight of the batch.

At the termination of the respective treating cycles the dry, coherent, plastic mass was unloaded from the machine through the discharge door located below the rotors, and fed directly to sheeting rolls wherein it was converted into smooth, homogeneous sheets of uniform thickness.

*Example II*

In this example, the starting material was a residuum of butadiene-acrylonitrile copolymer latex (GR-N).

Three separate batches of this material were run, utilizing a size B Banbury, to operate upon the material. In these runs, the conditions of operation, in respect of time, horsepower input and maximum temperatures, were as follows:

|  | Time | Maximum H. P. per pound | Maximum Temperature (° F.) |
| --- | --- | --- | --- |
| Run #1 | 6.7 | 3.9 | 270 |
| Run #2 | 8.1 | 4.4 | 265 |
| Run #3 | 7.8 | 4.6 | 260 |

The mass discharged from the Banbury in each of these runs at the termination of the respective treating cycles, was dry, coherent and readily sheetable into homogeneous sheets of uniform thickness.

Although the invention has herein been described with particular reference to its use in the economical recovery of synthetic rubber latex residuums normally discarded as a waste material in the production or use of such latices, and although the invention will find its chief utility and advantages in that connection, it should be understood that my invention may also by employed as an economical method for the drying of coagulated rubbers, including those derived from synthetic latex as well as from natural latex.

Having fully described my invention, what I claim is:

1. A process of treating an aqueous coagulum of a synthetic latex selected from the group consisting of polymers of isoprene, polymers of vinyl chloride, polybutadiene, copolymers of butadiene-styrene, copolymers of butadiene-acrylonitrile and copolymers of butadiene-acrylonitrile and copolymers of butadiene-isobutylene, said coagulum containing water in amounts of from 10% to 50% by weight, which comprises mechanically expressing from a batch of said coagulum in a closed working chamber a substantial portion of the water content of said coagulum and subjecting the thus partially dewatered batch in said chamber to intense shearing action while held under mechanical compression to develop an energy averaging not less than 1.5 horsepower per pound based on the dry weight of the batch, during a treating cycle of the order of 2 to 10 minutes while permitting escape of the steam thereby generated from the contained water, controlling the temperature of the batch during said cycle so that it does not exceed about 300° F., and continuing said action within the cycle of treatment until the batch has been transformed into a plastic, sheetable mass.

2. A process as defined in claim 1, wherein said latex is a butadiene-acrylonitrile copolymer.

3. A process as defined in claim 1, wherein a finely divided solid, in an amount of from 5 to 35 percent by weight of the batch, is incorporated therein to assist the said mechanical action.

4. A process as defined in claim 1, wherein said coagulum comprises a waste residuum of a butadiene-styrene copolymer.

5. A process as defined in claim 1, wherein said coagulum comprises a waste residuum of a butadiene-styrene copolymer and wherein said energy input results from the treatment of a batch of the coagulum weighing approximately 160 to 185 pounds held under mechanical compression of the order of 150 to 200 pounds per square inch in the working chamber of a Banbury machine while its rotors are operated at a speed of from about 50 to 100 R. P. M.

6. A process as defined in claim 5, wherein the treatment is effected in the presence of a small amount of a mixture of alkylated phenols effective to prevent substantial polymerization of unpolymerized monomer during said treatment of the batch.

7. A process as defined in claim 5, wherein the treatment is effected in the presence of carbon black in an amount of from about 5 to 35 percent by weight of the batch.

8. A process as defined in claim 1, wherein said latex is a butadiene-styrene copolymer.

9. A process as defined in claim 8 wherein the treatment is effected in the presence of from 0.1 to 2 percent of a substance capable of preventing any substantial polymerization of unpolymerized monomer during said treatment of the batch.

10. A process as defined in claim 1, wherein the said energy input results from described treatment of a batch of the coagulum weighing approximately 160 to 185 pounds; held under mechanical compression of the order of 150 to 200 pounds per square inch in the working chamber of a Banbury machine while its rotors are operated at a speed of from about 50 to 100 R. P. M.

11. A process as defined in claim 10, wherein said control of the temperature of the batch is effected by pumping cooling fluid through the jacketed walls of the working chamber.

References Cited in the file of this patent

UNITED STATES PATENTS

| | | |
|---|---|---|
| 2,617,775 | Newberg et al. | Nov. 11, 1952 |
| 2,617,782 | Paton et al. | Nov. 11, 1952 |